May 6, 1947.  R. H. JOHNSON  2,420,043
CONTROL APPARATUS
Filed Feb. 4, 1942  3 Sheets-Sheet 1

INVENTOR
ROBERT H. JOHNSON
BY
ATTORNEY

May 6, 1947.  R. H. JOHNSON  2,420,043
CONTROL APPARATUS
Filed Feb. 4, 1942  3 Sheets-Sheet 2
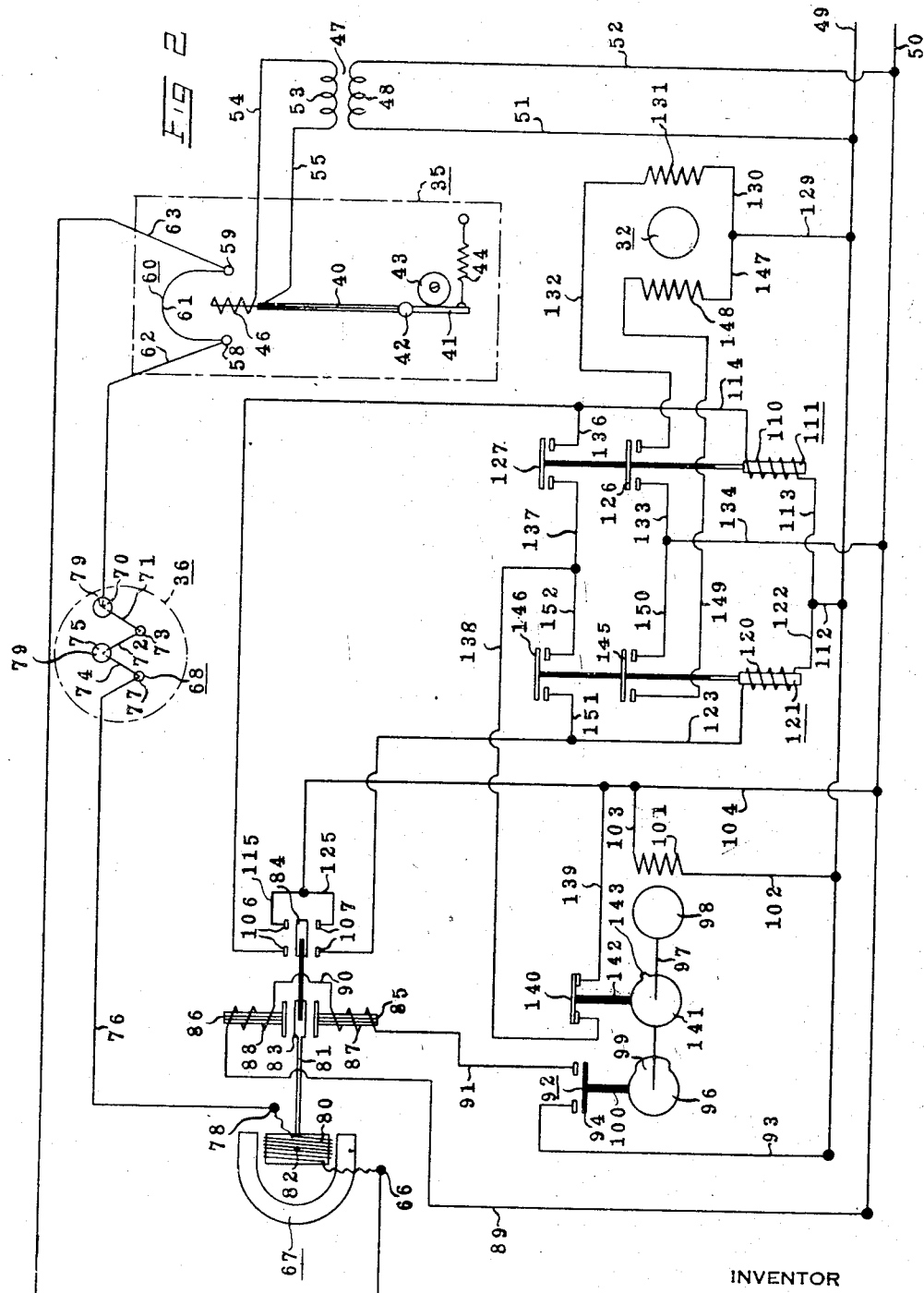
INVENTOR
ROBERT H. JOHNSON
BY
Warren W. F. Schmidt
ATTORNEY

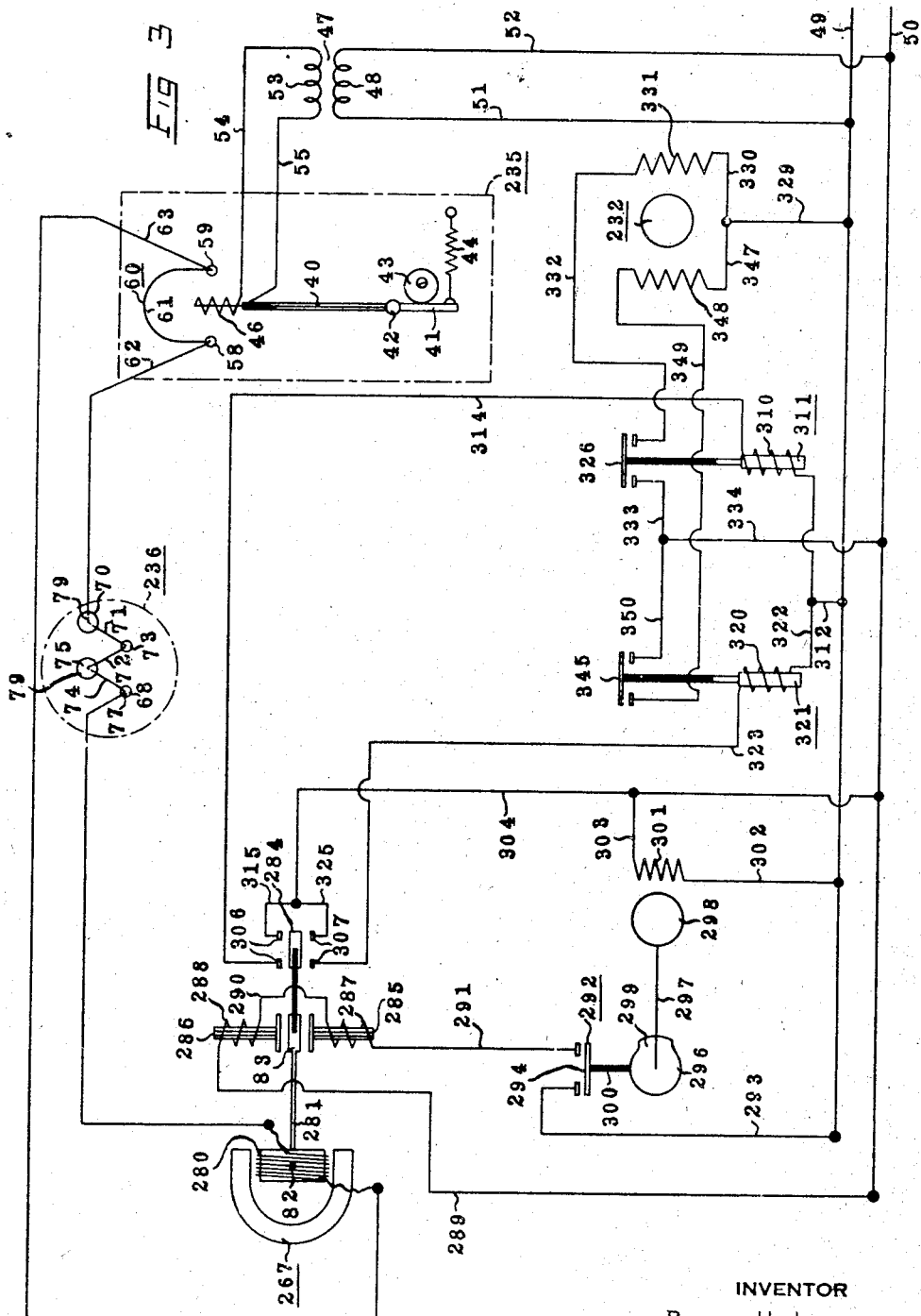

Patented May 6, 1947

2,420,043

UNITED STATES PATENT OFFICE 2,420,043

CONTROL APPARATUS

Robert H. Johnson, Weston, W. Va.

Application February 4, 1942, Serial No. 429,483

13 Claims. (Cl. 236—9)

The present invention relates to a control apparatus and method for automatically regulating a condition, such as, for example, regulating the temperature in a heated building.

One of the objects of the present invention is to provide a control apparatus and method for effecting control of a condition, which apparatus effects such control in accordance with movement of one member thereof relative to another member in response to changes in the condition, but without the members necessarily contacting one another.

Another object of the invention is to provide a control apparatus and method for effecting changes in a condition according to the movements of a member responsive to changes in the condition, the control apparatus being effective to cause the changes at intervals and according to the position of the movable member at these intervals.

Still another object of the invention is to provide a control apparatus and method for a heat exchange system for a building, for example, in which the temperature of the building is affected by a fuel burner, which control apparatus includes a device responsive to the air temperature in the building for causing an increase or decrease in fuel combustion and a device responsive to the rate of increase or decrease in temperature of the fuel burner for preventing too rapid increase or decrease in temperature of the burner, thereby forestalling over heating and under cooling of the fuel burner due to the lag between the changes in the temperature of the fuel burner and the changes in the temperature of the air in the building and minimizing fluctuation in the air temperature in the building.

It is also an object of the invention to provide a control apparatus and method similar to that described in the preceding paragraph in which the device responsive to the temperature of the building modifies the effect of the device responsive to the rate of change in temperature of the fuel burner, so that, as the building temperature deviates more or less from a predetermined temperature, the rate at which the temperature of the fuel burner changes is proportionally changed, respectively.

Still another object of the invention is to control the rate of movement of a valve that is effective to increase or decrease the rate of combustion in a heating system, for example, so that the rate of movement of the valve will be proportional to changes in temperature of a medium being controlled from a predetermined temperature.

Further objects and advantages will be apparent from the following description, reference being had to the accompanying drawings wherein preferred forms of embodiments of the present invention are clearly shown.

In the drawings:

Fig. 2 is a diagrammatic showing of the control apparatus; and,

Fig. 3 is a diagrammatic showing of another form of control apparatus.

Figure 1:
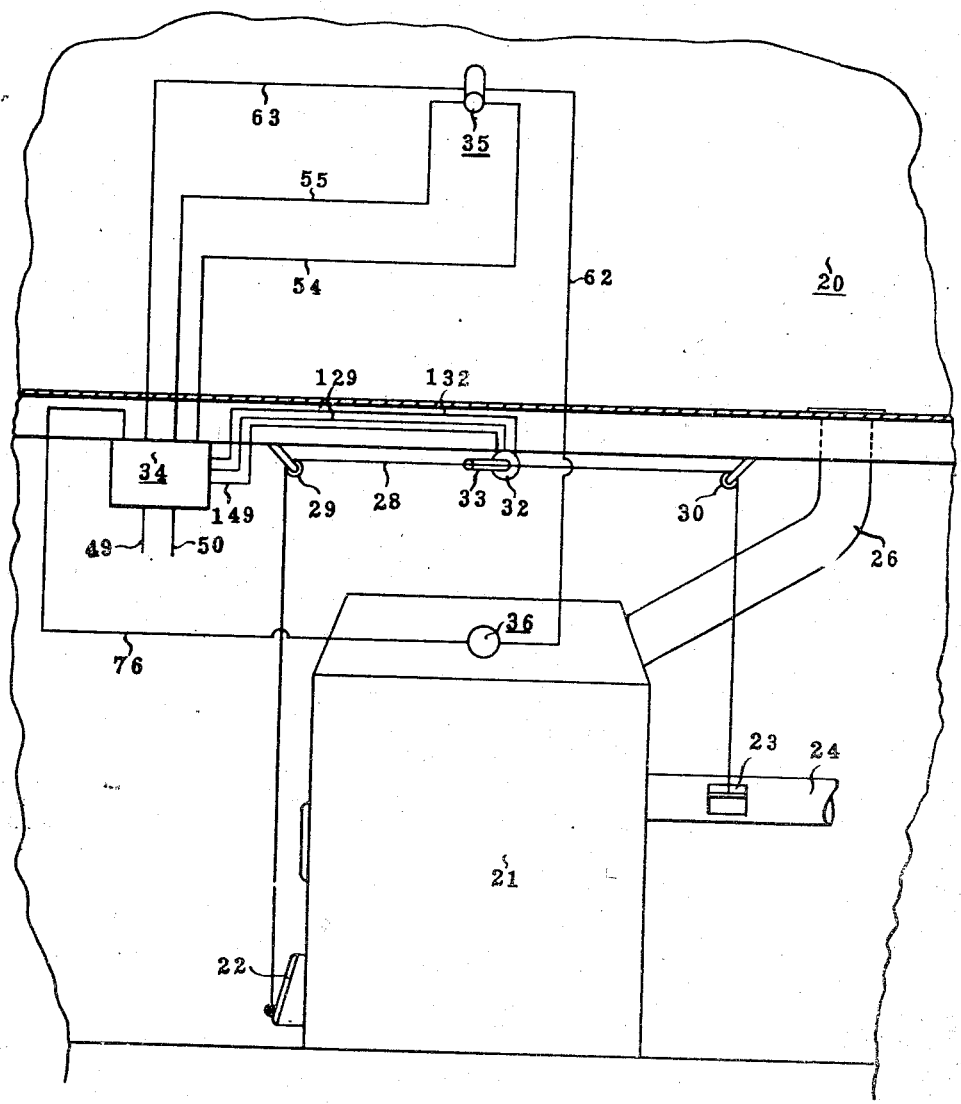
Fig. 1 is a fragmentary view of a building heated by a furnace, the furnace being controlled by my improved control apparatus and method.

Although my invention could be used to control various conditions, it is particularly suitable for controlling heating systems, and for illustrating a preferred form of the invention, I have shown a household heating system incorporating the invention. Referring to the drawings, a room 20 is adapted to be heated by a furnace 21. The furnace 21 is the usual hand fired coal burning type and combustion of the fuel is controlled by a draft damper 22 located in the ash pit door of the furnace and a flue damper 23 located in the flue pipe 24. Heated air is directed from the furnace to the room through ducts, one of which is shown at 26.

The dampers 22 and 23 are interconnected by a chain or cable 28 that rides on pulleys 29 and 30. The length of the chain is such that when the damper 22 is closed the damper 23 is fully opened, and vice versa. The dampers are actuated by an electric motor 32 that is connected to the chain 28 by a crank 33. When the motor rotates the crank 33 counterclockwise, as viewed in Fig. 1, through 180°, damper 22 is opened and damper 23 is closed. The motor 32 is a reversible type, and stops, not shown, are provided for limiting the movement of the crank 33 to rotation through 180°.

The motor 32 is controlled by switching mechanism indicated generally at 34. The switching mechanism is in turn controlled by a temperature responsive device 35 that is located in the room 20 and also by a device 36 which, preferably, is responsive closely to changes in temperature of the furnace and is herein shown in heat exchange relation with the air in the bonnet of the furnace. The device 36 is responsive to the rate of change in the temperature of the air in the bonnet.

The device 35 comprises a bi-metal strip 40 that is attached at one end to a lever 41. The lever 41 is provided with a hub 42 which forms a pivot for the lever and the bi-metal strip 40 extends from the hub. The position of the free end of the bi-metal 40 can be adjusted by rotating a cam 43, as the lever 41 is continually urged against the periphery of the cam by a spring 44. An electric heating element 46 is carried on the end of the bi-metal strip and is insulated from the strip. The heater element is a low voltage type and is energized by a step-down transformer 47. The primary winding 48 of the transformer is connected to the usual 110 volt household power lines 49 and 50 by wires 51 and 52. The secondary winding 53 of the transformer is connected to the heating element by wires 54 and 55. The heating element 46 is arranged to be moved by deflection of the bi-metal 40 intermediate junctions 58 and 59 of a thermocouple indicated generally at 60, so that these junctions are heated above atmospheric temperatures preferably by radiant heat. The thermocouple 60 comprises a U shaped constantan wire 61 having the ends thereof joined with copper wires 62 and 63 at 58 and 59. The wire 61 is preferably shielded from the heat of the heater 46 except at the junctions 58 and 59. The circuit for the thermocouple 60 includes a galvanometer 67 and a thermopile 68, which latter comprises the device 36. The wire 62 is connected to the thermopile 68 at a junction 70 and the wire 63 is connected with a terminal 66 of the galvanometer. The lever 41 is adjusted by the cam so that when the temperature of the bi-metal 40 is 72° F., for example, the heater element 46 is mid-way between the junctions 58 and 59 and each junction is subjected to the same intensity of radiant heat, and therefore, the temperatures of these junctions will be substantially the same. It is to be understood, however, that the lever 41 could be adjusted by the cam so that the heater element would be midway between the junctions of the thermocouple at other temperatures than 72° F. As the temperature of the bimetal decreases, the heater element 46 is moved toward the junction 59 for increasing the intensity of the radiant heat at that junction while causing a decrease in the intensity of the heat at the junction 58. This increases and decreases the temperatures of the junctions 59 and 58, respectively. When the temperature of the bimetal is raised above 72° F., the heater element is moved nearer to the junction 58 and that junction becomes warmer than the junction 59. Thus, on a decrease in temperature of the bimetal below 72° F., an electric potential will be established tending to cause a flow of current through the thermocouple circuit from wire 61 to wire 63, and on an increase in temperature above 72° F., the flow of current or potential will be established in the opposite direction. When the heater element is exactly intermediate the junctions, both junctions are heated equally and no current will be generated.

The junction 70 of thermopile 68 is connected with a constantan wire 71. The opposite end of the wire 71 is joined with one end of a copper wire 72 at junction 73 and the opposite end of the wire 72 is connected to a constantan wire 74 at junction 75. The opposite end of the wire 74 is connected to a copper wire 76 at junction 77. The junctions 70 and 75 are each in close heat exchange relation with a mass of heat absorbing material 79, such as copper, so that the temperatures of the wires at these junctions will lag with respect to changes in ambient temperature. The junctions 73 and 77 are each in close heat exchange relation with masses smaller than those of junctions 70 and 75 or they may be exposed directly to changes in temperature so that when the thermopile is subjected to changes in temperature, there will be a differential in temperature between the junctions 70 and 73, and 75 and 77, respectively. The thermopile 68 is subjected to the air in the bonnet of the furnace.

The wire 76 is connected to a terminal 78 of the galvanometer 67, and the coil 80 of the galvanometer is connected in series with the thermocouples 60 and 68 through the terminals 66 and 78.

It will be apparent that when the temperature of the air in the bonnet increases, the temperatures of the junctions 73 and 77 of the thermopile will increase more rapidly than the temperatures of the junctions 70 and 75 and, therefore, an electric current will be established in wire 76 tending to flow toward the coil 80. When the temperature of the air in the bonnet decreases, the thermopile 68 will establish an electric current tending to flow in the opposite direction since the junctions 73 and 77 will be cooler than junctions 70 and 75. When the temperature of the air in the bonnet of the furnace is constant or substantially constant, the junctions of the thermopile 68 will be at the same temperatures, and therefore, no potential will be established by it. Thus, the thermopile establishes an electric potential proportional to the rate of change in temperature, and the direction of flow of current is dependent on whether the temperature is increasing or decreasing.

It will be noted that the thermocouple 60 and thermopile 68 establish currents of the same polarity, or augment one another, whenever the temperature of the bimetal 40 is above or below 72° F., and the air in the furnace bonnet is increasing or decreasing, respectively, and that potentials are established counter to one another whenever the temperature of the bimetal 40 is above or below 72° F., while the temperature of the air in the furnace bonnet is decreasing or increasing, respectively.

The galvanometer 67, a top plan view of which is shown diagrammatically in Fig. 2, is constructed so that when the potential at the terminal 66 of the galvanometer 67 is greater than the potential at the terminal 78, the coil 80 will be deflected in a counter-clockwise direction, for example, and when the potential at 78 is greater than at 66, the coil will be deflected in a clockwise direction. When the potentials are exactly the same or zero, the coil will be in the position shown in Fig. 2. It is apparent that the galvanometer is responsive to the algebraic sum of the potentials established by the thermopile and thermocouple.

An armature 81, which is mounted on a vertical pivot 82, is oscillated by movement of the coil 80, and this armature carries an iron armature 83 and a contact bar 84.

Two suitable electromagnets, shown diagrammatically at 85 and 86, are arranged on opposite sides of the armature 83 and are equally distant from the armature when the coil 80 is in the position shown in Fig. 2. The magnets 85 and 86 include coils 87 and 88, respectively, and these coils are connected in series. The coil 88 is connected to the line 50 by a wire 89 and to the coil 85 by wire 90. Coil 87 is connected to the line 49 by a circuit including a wire 91, time switch 92 and wire 93.

The time switch 92 includes a contact bar 94 that is adapted to bridge two contacts connected with wires 91 and 93, respectively. The contact bar 94 is arranged to be closed on the contacts periodically by a cam 96. The cam 96 is mounted on a shaft 97 that is driven by an electric timing motor 98 and is provided with a lift 99. A cam follower 100 rides on the periphery of the cam and is attached to the contact bar 94 for causing the switch 92 to be closed by the lift 99 of the cam. Preferably, the motor 98 is adapted to rotate the cam at the rate of two revolutions per minute and the lift 99 is formed so that the switch 92 is closed for approximately five seconds during each revolution. The winding 101 of the motor 98 is connected with the line wires 49 and 50 by wires 102, 103 and 104. Thus, the magnets 85 and 86 are energized every thirty seconds and they remain energized for approximately five seconds. If the armature 81 is in the position shown in Fig. 2, the pull of the magnets on the armature 83 are neutralized and the armature 81 will remain stationary. However, if the armature 81 is deflected toward one or the other of the magnets, due to current passing through the coil 80 in one direction or the other, the armature 83 will be attracted to the nearer magnet when the magnets are energized, and the contact bar 84 will bridge contacts 106 or contacts 107 according to the direction of flow of current in coil 80. Preferably, the coil 80 is incapable of moving armature 81 sufficiently to cause the contact 84 to close contacts 106 and 107 independently of the action of the magnets.

The closure of contacts 106 causes the energization of a coil 110 of a magnetic relay 111 through the following circuit: line 49, wires 112, 113, coil 110, wire 114, contacts 106 and 84, wires 115, and 104 to line 50. When the contact 84 closes contacts 107, a coil 120 of a magnetic relay 121 is caused to be energized by a circuit established from line 49 through wires 112, 122, coil 120, wire 123, contacts 107 and 84, wires 125, and 104 to line 50.

The magnetic relay 111, when energized, closes two switches, 126 and 127. The closure of switch 126 establishes a circuit through a furnace control device such as the motor 32 as follows: from line 49 through wires 129, 130, motor winding 131, wire 132, switch 126, wires 133 and 134 to line 50. The winding 131 in the embodiment shown, causes the motor 32 to rotate in the direction to open the damper 22 and close the damper 23, for example, for causing an increase in the draft through the furnace and consequently the rate of combustion. The closure of switch 127 establishes a holding circuit for the relay 111 as follows: line 49, wires 112, 113, coil 110, wires 114, 136, switch 127, wires 137, 138, switch 140, wires 139 and 104 to line 50. The switch 140 is normally closed and it is arranged to be opened by a cam 141 that is mounted on the shaft 97. A cam follower 142 rides on the periphery of the cam and engages the movable contact of the switch 140. The follower 142 is actuated by a lift 143 on the periphery of the cam and causes the switch to be opened for approximately one second and then reclosed during the time that the switch 92 is closed by the cam 96. Preferably, the cam 141 is positioned on the shaft 97 so that the switch 140 will reclose just prior to reopening of switch 92. This will allow at least several seconds for the armature 81 to be attracted to one or the other of the magnets 85 and 86 before the holding circuit is broken.

The magnetic relay 121, when energized, closes switches 145 and 146. When switch 145 is closed a circuit is established from line 49 through wires 129, 147, motor winding 148, wire 149, switch 145, wires 150 and 134 to line 50. Energization of the winding 148 in the present embodiment causes the motor 32 to rotate in the direction to close the damper 22 and open the damper 23. A holding circuit for the relay 121 is also established from line 49 through wires 112, 122, coil 120, wires 123, 151, switch 146, wires 152, 138, switch 140, wires 139 and 104 to line 50.

The galvanometer 67 and the magnets 85 and 86, together with the time switches 92, 140, motor 98 and the relays 111 and 121, are enclosed in a suitable housing and comprise the switching mechanism 34. This mechanism can be located in the furnace room, for example.

Preferably, the motor 32 operates the dampers 22 and 23 relatively slowly, requiring a period of 90 seconds, for example, to move the dampers from their closed positions to fully open positions and vice versa. This will produce closer control of combustion since the motor 32 will be energized for periods of approximately 30 seconds, and if at the end of these periods conditions at the devices 35 and 36 have changed, the motor will be deenergized or reversed by the mechanism 34. By energizing the motor for these periods, the action of the motor is positive, i. e., it will not alternate its direction during the time that the control phases are about to be reversed by the devices 35 or 36. Also, by providing a relatively slow operating damper control for a coal burning furnace, better combustion of the coal will be obtained.

When the control system is in operation, the heater element 46 is energized and the motor 98 is operating for periodically closing switch 92 and opening switch 140. Assuming that the damper 22 is closed, the damper 23 opened and the room temperature is at 72° F., the parts of the control apparatus will be in the positions shown in Fig. 2. When switch 92 is closed for energizing magnets 85 and 86, the armature 83 will remain in its neutral position and the damper control motor 32 will remain deenergized.

If the temperature in the room should fall below 72°, the increased heating at the junction 59 of the thermocouple 60 causes a potential to be established at the terminal 66 of the galvanometer 67. This causes the armature to be deflected toward magnet 86, and when the magnets 85 and 86 are energized by the closure of the time switch 92, the armature 83 is drawn to the magnet 86 which causes the contact 84 to close contacts 106. This energizes magnetic relay 111 which in turn causes energization of the winding 131 of the motor 32. The motor 32 operates to cause the damper 22 to move toward the fully open position and causes the damper 23 to move toward closing position for increasing the rate of combustion. After the switch 92 is closed for five seconds, it is reopened, but the relay 111 is maintained energized through its holding circuit that includes the switch 140. As the temperature of the air in the bonnet 36 increases, due to the increased rate of combustion in the furnace, the temperatures of the junctions 73 and 77 of the thermopile 68 increase over the temperatures of the junctions 70 and 75, thereby establishing a potential at the terminal 78 of the galvanometer opposing the potential established by the thermocouple 60. If the rate of increase in the change of temperature in the air of the bonnet of the furnace is a certain value, it will cause the potential established by the thermopile 68 to neutralize or overcome the effect of the potential at the terminal 66 and cause the coil 80 to return the armature 83 to, or move beyond, the neutral position. If the armature 81 is returned to its neutral position, when the switch 92 is closed, the armature will remain in its neutral position and the switch 140 will be opened and deenergize the magnetic relay 111. This causes the switch 126 to open and deenergize the motor 32. If the temperature of the air in the bonnet of the furnace continues to increase, due to the open draft damper 22, the potential established at the terminal 78 by the thermopile 68 will cause the coil 80 to deflect the armature 81 in the direction of the magnet 85 and when the switch 92 is closed, the armature 83 will be drawn to the magnet 85 and cause closing of the contacts 107 for energizing the relay 121. This relay closes the circuit for causing the motor 32 to rotate in the direction to close damper 22 and to open damper 23 to thereby decrease the rate of combustion. When the flow of current through the coil 80 is zero, due to the algebraic sum of the potentials established by the thermopile and thermocouple being equal to zero or substantially zero, the switch 140 will open and deenergize the relay 121 since the armature 83 will be in its neutral position when switch 92 is closed.

Although the room temperature may remain below 72° F., if the rate of increase in temperature of the air in the bonnet is great enough, the thermopile 68 will establish sufficient potential to cause the coil 80 of the galvanometer to be deflected for causing the armature 81 to come under the influence of the magnet 85 and cause the mechanism 34 to reverse the motor 32 for decreasing the rate of combustion. It is to be noted that the further the temperature in the room decreases from 72°, the thermocouple 60 will establish a higher potential in the galvanometer coil, and before the thermopile 68 can establish a counter potential for causing a decrease in the rate of combustion in the furnace, the rate of temperature increase in the bonnet will have to be correspondingly greater. Thus, the temperature responsive device 35 affects the effective responsiveness of the device 36 so that under extremely cold conditions the rate of increase in temperature of the furnace is increased. In this manner, the proper rate of combustion will always be maintained without causing an "over-ride" in the temperature of the room.

If the room temperature should increase above 72° F., the heater element 46 will be moved toward the junction 58 of the thermocouple 60 for increasing the temperature of that junction and reducing the temperature of junction 59. This establishes a flow of electric current in the circuit of the thermocouple in the direction for causing the mechanism 34 to cause the motor 32 to move the draft damper 22 toward closed position and move damper 23 toward open position for reducing the rate of combustion.

If, while the room temprature is above 72°, the rate of reduction in the temperature of the air in the bonnet of the furnace exceeds a certain value, the thermopile 68 will establish a current counter to the current established by the thermocouple 60 and cause the galvanometer to move to its neutral position for checking changes in the positions of the dampers, or the potential generated by the thermopile might affect the control mechanism to cause reopening of the draft damper. Thus, the sensitivity of the device 36 to changes in rate of decrease in temperature of the air inside the bonnet of the furnace is affected in proportion to the temperature of the room above 72°. For example, as the temperature of the junctions 73 and 77 of the thermopile falls below the temperature of the junctions 70 and 75, an electric potential is established tending to cause flow of current through the galvanometer coil in the direction for causing the motor 32 to move the damper 22 toward the open position. As the temperature of the room increases above 72°, the thermocouple 60 will establish a potential counteracting that produced by the thermopile and in proportion to the rise in temperature above 72°. Therefore, as the room temperature increases above 72°, the rate at which the temperature in the furnace bonnet decreases must increase before the thermopile will be effective to cause opening of the damper motor to increase combustion.

It is apparent that by controlling the combustion in the furnace according to the rate of change in the temperature thereof, the furnace will produce in actual practice, substantially only that amount of heat that is necessary to maintain the desired temperature in the room being heated and the furnace will never become colder than is necessary for that purpose. Therefore, by my invention, the lag between the furnace temperature and room temperature is substantially eliminated and a uniform temperature can always be maintained in the room being heated.

The sensitivity of the control apparatus to the rate of change in temperature of the air in the bonnet of the furnace can be increased by adding more thermocouples to the thermopile.

It is apparent that either one of the devices 35 and 36 can take over the control of the damper motor 32 or they can control operation of the motor jointly.

I do not consider it essential that the device 36 be employed in my control system, since the device 35 could control the switching mechanism 34 independently of the device 36. However, closer and more satisfactory control of the furnace can be had by incorporating the device 36 in the control system.

Referring to Fig. 3, I have shown another embodiment of the invention in which the rate of movement of the dampers 22 and 23 is regulated in accordance with the demands for changes in the rate of combustion. In this embodiment, the dampers 22 and 23 of the furnace 21 are actuated by an electrically driven motor 232. The motor 232, in the present embodiment, is an induction type motor and it operates at a relatively high speed, such as 3400 R. P. M., and it requires more than five seconds to attain its maximum speed. Suitable speed reducing mechanism, not shown, is interposed between the motor and the crank 33 for actuating the dampers so that the dampers will be operated at a slow speed, which speed will be more fully defined hereinafter. Preferably, the motor is designed so that the momentum created by energization of the motor for several seconds causes the motor to coast at least one-half minute after the motor is deenergized. This motor is also reversible.

The winding circuits for the motor 232 are controlled by two relays 311 and 321, which relays operate switches 326 and 345, respectively. These switches are closed when the relays are energized and opened when the relays are deenergized.

The relays 311 and 321 are controlled by a galvanometer 267, which galvanometer is similar to the galvanometer 67 and which is controlled by devices 235 and 236. The devices 235 and 236 are similar to devices 35 and 36 described hereinbefore, and are responsive to the air temperatures in the room 20 and in the bonnet of the furnace, respectively. The armature 281 of the galvanometer is arranged to be deflected by the coil 280 according to the direction of the current flowing therethrough, and two opposed electromagnets 285 and 286 are arranged to move the deflected armature positively in the direction of deflection when the magnets are energized. When the armature is attracted by the magnet 285 or magnet 286, the contact 284 is arranged to close the contacts 307 or 306, respectively. It is to be understood that the galvanometer 267 is operated by the devices 235 and 236 in the same manner that the galvanometer 67 is operated by the devices 35 and 36.

When contacts 306 are closed by the contact 284, a circuit is established through the relay 311 as follows: power line 49, wire 312, coil 310 of the relay, wire 314, contacts 306 and 284, wires 315 and 304, to power line 50.

Energization of relay 311 closes switch 326 for establishing a circuit for the motor 232 as follows: line 49, wires 329, and 330, winding 331 of the motor 232, wire 332, switch 326, and wires 333 and 334 to line 50. In the present embodiment energization of winding 331 causes the armature of motor 232 to rotate in a direction for opening damper 22 and closing damper 23 of the furnace 20.

When contacts 307 are closed by the contact 284, a circuit is established through the relay 321 as follows: line 49, wires 312 and 322, magnetic coil 320 of the relay, wire 323, contacts 307 and 284, wires 325 and 304 to line 50.

Energization of relay 321 closes the switch 345 for establishing the following circuit for motor 232: line 49, wires 329 and 347, winding 348 of the motor, wire 349, switch 345 and wires 350 and 334 to line 50. Energization of winding 348 causes the armature of the motor 232 to rotate in a direction to cause closing of damper 22 and opening of damper 23.

The magnets 285 and 286 are energized by the following circuit: line 49, wire 293, time switch 292, wire 291, coil 287, wire 290, coil 288 and wire 289 to line 50. The switch 292 is closed by a cam 296 that is mounted on a shaft 297 driven by an electric motor 298. The cam 296 is provided with a lift 299, and a bridging contact bar 294 is carried by a cam follower 300, which follower rides on the periphery of the cam. The motor 298 is arranged to operate continuously and to rotate the cam 296 two revolutions per minute. The lift 299 is formed for causing the switch 292 to be closed for approximately five seconds during each revolution of the cam. The motor 298 is energized by the following circuit: line 49, wire 302, winding 301 and wires 303 and 304 to line 50.

If, for example, the potentials established by either one or the other, or both of the devices 235 or 236 cause the galvanometer 267 to deflect the armature 281 toward the magnet 286 when the switch 292 is closed, the magnet 286 deflects the armature 281 for closing the contacts 306. This energizes the relay 311 and the switch 326 is closed for energizing winding 331 of the motor 232. The motor will be energized until cam 296 reopens the switch 292, at which time the armature 281 is released by deenergization of the magnet 286 and the circuit for the relay 331 is broken.

The momentum of the motor will cause it to continue to move the draft damper 22 toward open position and damper 23 toward closed position, although the motor is deenergized. When the cam 296 again closes the switch 292, if the armature 281 is still deflected toward the magnet 286 the relay 311 will be reenergized by the magnet 286 drawing the armature toward it and the motor 232 will be energized again for a period of five seconds or less, depending on the rapidity with which the armature 281 is drawn toward the magnet, during which time it will gain speed and accelerate the rate of movement of dampers 22 and 23. Preferably, the speed reducing mechanism mentioned hereinbefore, is such that the motor 232 moves the dampers 22 and 23 from closed to fully open positions when the motor is energized for four 5-second periods during four revolutions of the cam 296. It will be understood, of course, that during actual operation, the motor 232 may be reversed before the position of the dampers are fully reversed, and that under circumstances described hereinafter, the motor 232 may operate at lower speeds, therefore requiring more time to move the dampers from one extreme position to the other.

When the armature 281 of the galvanometer 267 is deflected but slightly from its neutral position, in which position it is unaffected by either of the magnets 285 or 286, it may require several seconds for the armature to be moved to close either the contacts 306 or 307, after the magnets 285 and 286 are energized. If, for example, it would require two seconds for closing the contacts 306, the motor 232 would be energized for approximately three seconds. Consequently, at the end of the three seconds the motor would be moving at a relatively low speed since it must overcome its starting inertia, and the dampers would be moved at a relatively slow rate. This would tend to cause an increase in the combustion in the furnace at a relatively slow rate, but since the galvanometer 267 indicated a very slight need for increased combustion, the combustion would be regulated accordingly. The same condition would prevail for moving the dampers in the opposite direction, i. e., for reducing the rate of combustion. It is apparent, that when the armature 281 of the galvanometer is deflected substantially from its neutral position, when the magnets 285 and 286 are energized, the armature will be deflected substantially immediately to the nearest magnet and cause the motor 232 to be energized for substantially five seconds. Since the speed of the motor is dependent upon the duration of the periods that it is energized, and the duration of the periods dependent on the deflection of the armature 281, the rate of movement of the dampers is controlled proportional to the extent of demand for a change in combustion.

It is to be understood that any suitable device may be used to cause movement of the dampers at a rate proportional to the duration of the periods at which the relay circuits are energized.

Thus, by my invention, a valve, in this case the damper 22, for controlling the rate of combustion can be moved at speeds proportional to the demand for combustion, thereby tending to maintain the furnace at the proper temperature at all times. This provides a modulating control that can be used for operating fuel valves for gas or oil burners so that a very close temperature can be maintained.

By my invention, a control apparatus is provided in which the condition responsive devices operate to establish electric circuits without causing the thermal elements to open and close contacts. This produces more accurate control of the system and trouble-free operation of the thermostatic devices.

While the forms of embodiments of the present invention as herein disclosed constitute preferred forms, it is to be understood that other forms might be adopted, all coming within the scope of the claims which follow.

I claim:

1. In a heat exchange system, a heat exchanger and a medium affected by the heat exchanger; means for causing a change in the temperature of the exchanger; and means responsive to rate of change in temperature of the heat exchanger for controlling the rate of said change of temperature, said first mentioned means also varying the effective responsiveness of the second mentioned means to a rate of change in temperature of the heat exchanger in proportion to the change in temperature of the medium from a predetermined temperature, said first mentioned means including a device responsive to the temperature of the medium for varying the effectiveness of the first mentioned means.

2. In a heat exchange system, a heat exchanger for affecting the temperature of a medium; means for establishing an electric potential proportional to the deviation of the temperature to which said means is subjected from a predetermined temperature; means for establishing an electric potential counter to the first mentioned potential and proportional to the rate of change of temperature to which the last mentioned means is subjected, one of said means including a device subjected to the temperature of the medium for varying the effectiveness of the said means and the other of said means being subjected to a temperature corresponding to changes in the temperature of the exchanger; and means responsive to the algebraic sum of said potentials for controlling the temperature of the heat exchanger.

3. In a heat exchange system, a heat exchanger for affecting the temperature of a medium; electroresponsive means for changing the temperature of the heat exchanger; and means for energizing the first mentioned means including, an element responsive to the temperature of the medium for establishing a current potential for affecting the first mentioned means and an element responsive to the rate of change of the temperature of the heat exchanger for establishing a current potential opposing the first mentioned potential.

4. In a control system, a control member movable in response to changes in a condition to be controlled, said member including an armature; means forming a plurality of magnetic fields, each of said fields exerting equal magnetic forces on said armature when the armature is in a predetermined position; timing means for rendering the magnetic fields effective and ineffective substantially simultaneously; and means controlled by said member for affecting said condition when said member is moved from said predetermined position in response to a change in said condition and attracted by either of said fields.

5. In a control system, a control member movable in response to changes in a condition to be controlled; means providing a source of energy operable for moving said member to a predetermined control position when the member is moved to a certain position in response to a change in said condition; means providing a second source of energy operable for moving said member to a second predetermined position when the member is moved to a different predetermined position in rsponse to a different change in said condition; timing means for rendering said first and second means effective and ineffective substantially simultaneously; and means controlled by said member when moved by either of said first and second means for affecting said condition.

6. In a heat exchange system, a heat exchanger and a medium affected thereby; means responsive to an electric potential for controlling the heat exchange between the exchanger and the medium; means for varying the electric potential including two thermocouple elements, one of said thermocouple elements being more sensitive to temperature changes of the heat exchanger than the other, said second means including a third thermocouple element for modifying the potential; and means responsive to the temperature of the medium for varying the effectiveness of the third mentioned thermocouple.

7. In a heat exchange system, a heat exchanger and a medium affected thereby; means responsive to an electric potential for controlling the heat exchange between the exchanger and the medium; means for varying the electric potential including two thermocouple elements, one of said thermocouple elements being more sensitive to temperature changes of the heat exchanger than the other, said second means including two thermocouple elements for modifying the potential; and means responsive to the temperature of the medium for increasing and decreasing the potential effect of one of the last two mentioned thermocouple elements and simultaneously decreasing and increasing the potential effect of the other of the two last mentioned thermocouple elements.

8. A control system including in combination, a device to be controlled; a thermocouple including two junctions; heat exchange means thermally associated with the thermocouple junctions; means movable in one direction for causing the heat exchange means to establish one of said junctions as a cold junction and the other as a warm junction and movable in the opposite direction for causing said heat exchange means to change the cold junction to a warm junction and the warm junction to a cold junction; means responsive to the flow of current in said thermocouple in one direction for effecting the operation of said controlled device in a certain manner and responsive to the flow of current in said thermocouple in the opposite direction for effecting the operation of said controlled device in another manner; and means responsive to the effects produced by the controlled device for effecting said movements of the movable means.

9. A control system comprising in combination, a variable capacity device for affecting the condition of a medium; an electrical circuit including an electrically operated controller for controlling the output of said device, an electrical generator capable of generating current in either direction and of variable potential in either direction of flow, the direction of flow and the capacity of current generated thereby being dependent upon the rate of change of output of said device, a second electrical generator having a variable capacity, said electrically operated controller being controlled by the algebraic sum of the current generated by said generators; and means responsive to the condition of the medium affected by said device for controlling the current output of the second mentioned generator.

10. A control system comprising in combination, a variable capacity device for affecting the condition of a medium; an electrical circuit including an electrically operated controller for controlling the output of the device, a variable capacity electrical generator, the capacity of said generator being variable in response to the rate of change of output of said device, a second electrical generator capable of generating current in either direction and of variable potential in either direction of flow, said electrically operated controller being controlled by the algebraic sum of the current generated by said generators; and means responsive to the condition of the medium affected by said device for controlling the direction of current flow and current output of the second mentioned generator.

11. A control system comprising in combination, a variable capacity device for affecting the condition of a medium; an electrical circuit including an electrically operated controller for controlling the output of said device, an electrical generator capable of generating current in either direction and of variable potential in either direction of flow, the direction of flow and the capacity of current generated thereby being dependent upon the rate of change of output of said device, a second electrical generator capable of generating current in either direction and of variable potential in either direction of flow, said electrically operated controller being controlled by the algebraic sum of the current generated by said generators; and means responsive to the condition of the medium affected by said device for controlling the direction of current flow and current output of the second mentioned generator.

12. A control system including in combination, a device to be controlled; generating means operable for establishing a first electric potential and operable for establishing a second electric potential having its polarity opposite that of the first mentioned potential, said generating means including two elements subjected to controlling medium, the potential established being dependent upon the difference of intensity of said medium on said elements; means responsive to the potential established for controlling the operation of said device; and means responsive to the operation of the controlled device for increasing and decreasing the intensity of the medium at one of said elements.

13. A control system including in combination, a device to be controlled; generating means operable for establishing a first electric potential and operable for establishing a second electric potential having its polarity opposite that of the first mentioned potential, said generating means including two elements subjected to controlling medium, the potential established being dependent upon the difference of intensity of said medium on said elements; means responsive to the potential established for controlling the operation of said device; and common means responsive to the operation of the controlled device for increasing the intensity of the medium at one of said elements and substantially simultaneously decreasing the intensity of the medium at the other of said elements and for decreasing the intensity of the medium at said one element while substantially simultaneously increasing the intensity of the medium at said other element.

ROBERT H. JOHNSON.

REFERENCES CITED

The following references are of record in the file of this patent:

UNITED STATES PATENTS

| Number | Name | Date |
|---|---|---|
| 2,265,294 | Lange | Dec. 9, 1941 |
| 1,910,340 | Johnson | May 23, 1933 |
| 2,216,301 | Sparrow | Oct. 1, 1940 |
| 1,994,983 | De Florez | June 12, 1928 |
| 1,775,682 | Martin | Sept. 16, 1930 |
| 2,140,473 | Grant | Dec. 13, 1938 |
| 2,279,107 | Cahn | Apr. 7, 1942 |
| 2,218,454 | Midyette | Oct. 15, 1940 |
| 2,047,234 | Smith | July 14, 1936 |
| 2,014,385 | Lamb | Sept. 17, 1935 |
| 2,266,185 | Fillo | Dec. 16, 1941 |
| 2,164,352 | Sargent | July 4, 1939 |
| 1,922,251 | Malpass | Aug. 15, 1933 |
| 1,058,541 | Brown | Apr. 8, 1913 |
| 2,261,343 | De Florez | Nov. 4, 1941 |
| 2,331,476 | Jones | Oct. 12, 1943 |
| 1,673,591 | Reid | June 12, 1928 |